J. C. MOORE.
FLUID MEASURING DEVICE.
APPLICATION FILED DEC. 1, 1919.

1,379,122. Patented May 24, 1921.
3 SHEETS—SHEET 1.

Inventor
J. C. Moore

Witness

By C. A. Snow & Co.
Attorneys.

J. C. MOORE.
FLUID MEASURING DEVICE.
APPLICATION FILED DEC. 1, 1919.
1,379,122.
Patented May 24, 1921.
3 SHEETS—SHEET 2.
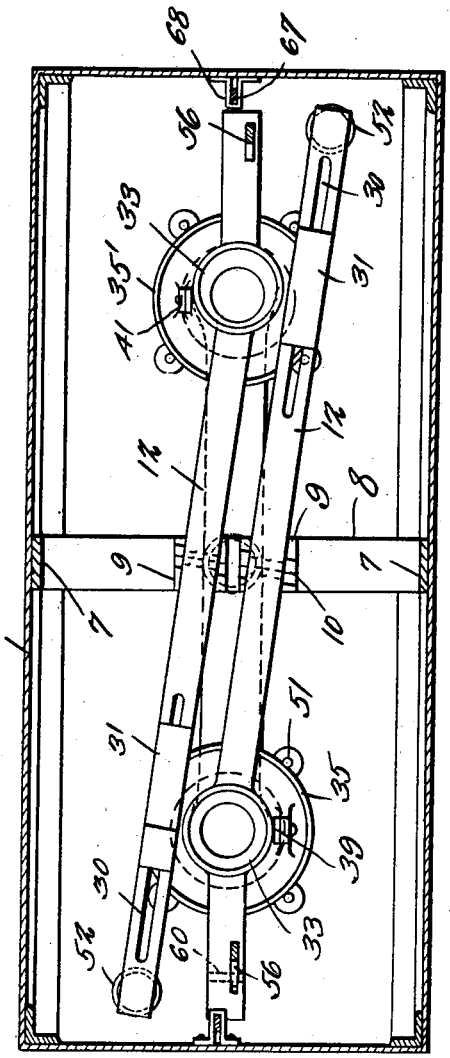
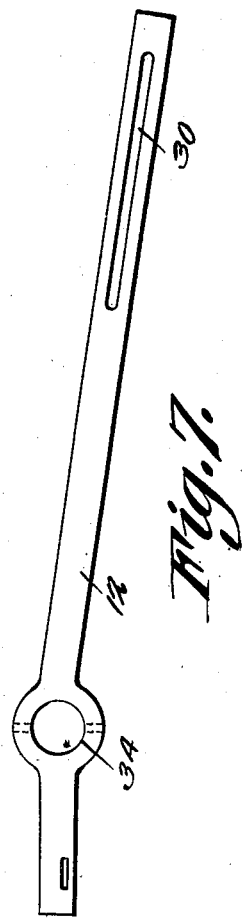
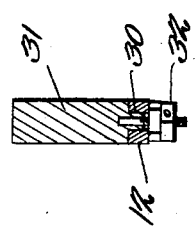
Inventor
J. C. Moore
By C. A. Snow & Co.
Attorneys
Witness

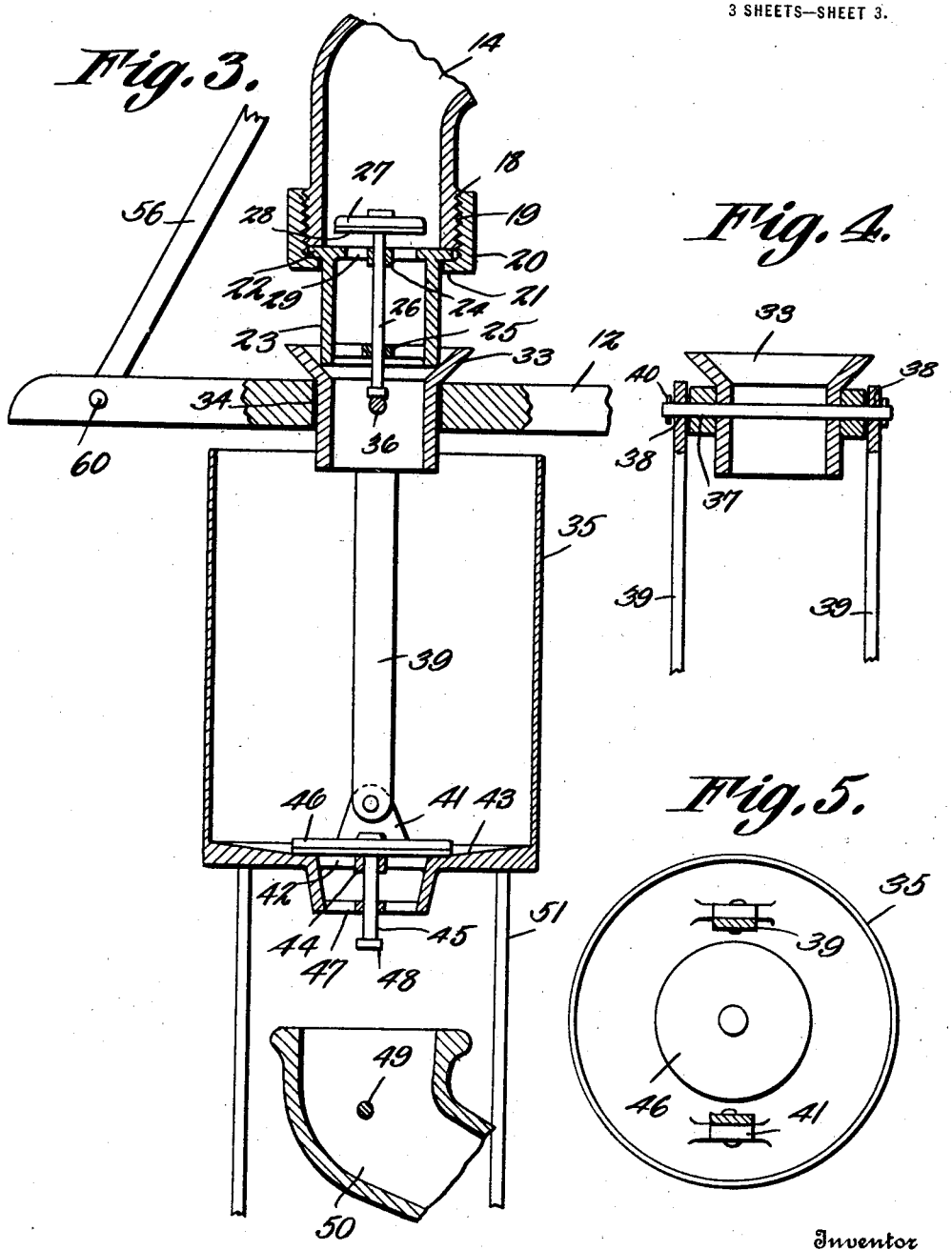

UNITED STATES PATENT OFFICE.

JULIUS CLINTON MOORE, OF RALEIGH, NORTH CAROLINA.

FLUID-MEASURING DEVICE.

1,379,122.  Specification of Letters Patent.  Patented May 24, 1921.

Application filed December 1, 1919. Serial No. 341,597.

*To all whom it may concern:*

Be it known that I, JULIUS CLINTON MOORE, a citizen of the United States, residing at Raleigh, in the county of Wake and State of North Carolina, have invented a new and useful Fluid-Measuring Device, of which the following is a specification.

This invention relates to fluid measuring devices, and more particularly to a novel device for measuring gasolene in its passage from one tank to another.

The primary object of the invention is to provide a device of this character to facilitate the measuring of fluid by weight, thus eliminating the use of the unsatisfactory method of measuring the fluid by quantity.

A further object of the invention is to provide means forming a part of the device for locking the measuring receptacles in their discharging positions, for a predetermined period, thus insuring the entire contents of the receptacles or containers being delivered, for a given weight.

A still further object of the invention is to provide visible registering means for registering the amount of fluid measured, the measuring means being actuated by the movements of the containers.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Fig. 2 illustrates a sectional view taken on line 2—2 of Fig. 1; and

Fig. 3 illustrates a fragmental sectional view through the discharge and receiving pipes, a container being shown in its filling position.

Fig. 4 illustrates a sectional view through one of the funnel members.

Fig. 5 illustrates a plan view of the same.

Fig. 6 illustrates a sectional detail view disclosing the connection between the weights and their pivoted arms.

Fig. 7 illustrates a plan view of one of the pivoted arms.

Figure 1:
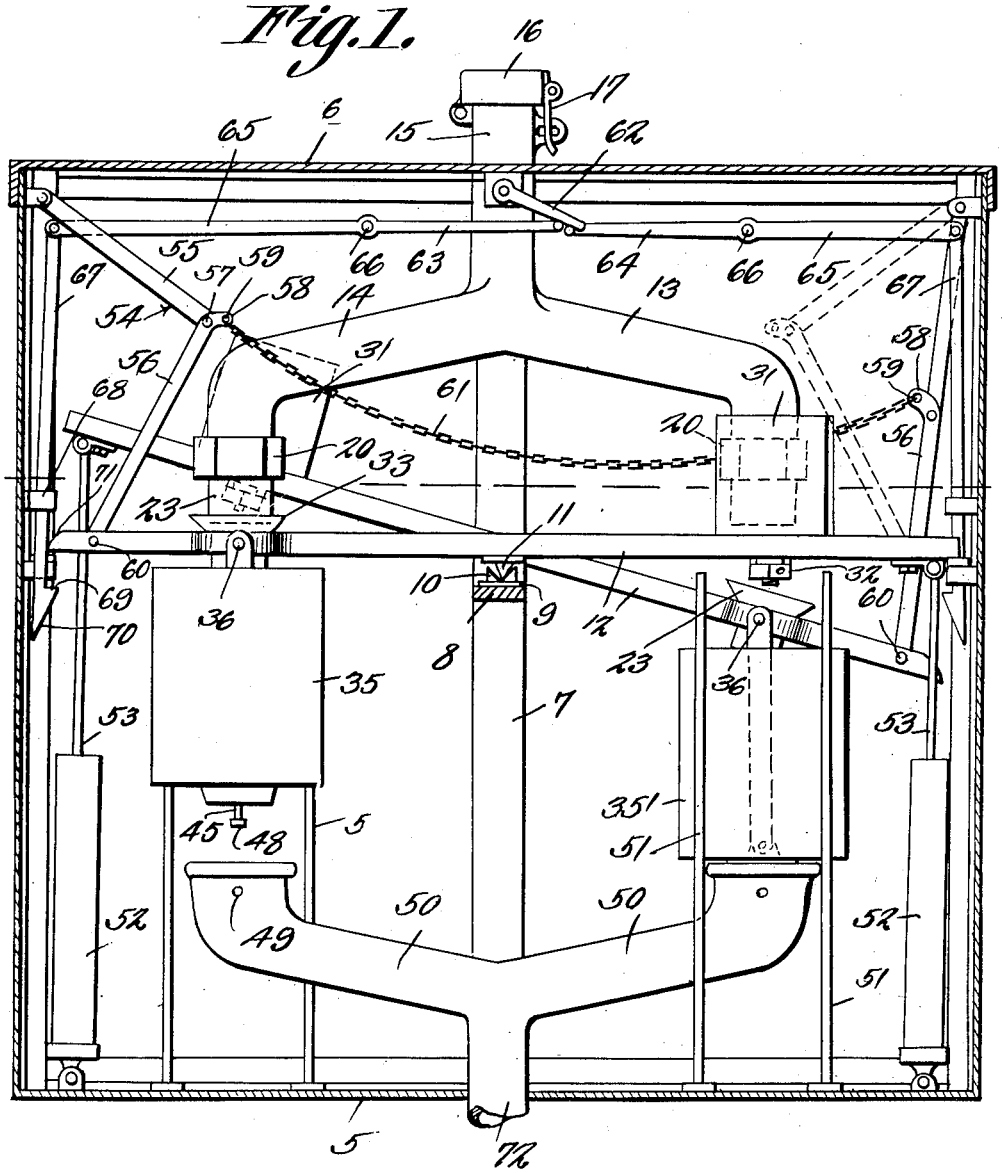
Figure 1 illustrates a longitudinal sectional view through a casing housing a measuring device constructed in accordance with the present invention.

Referring to the drawings in detail, the reference character 5 designates the casing or housing for the measuring device forming the subject matter of the present invention, the same being constructed of metal or other suitable material, and comprises a removable cover 6, the casing being of any suitable size, according to the dimensions of the measuring apparatus contained therein, and it is to be understood that when the device is put to practical use, the same is positioned below the ground surface in close proximity to the tank filled therethrough, however the device may be employed for measuring gasolene or other fluid dispensed by the retailer, whereupon it would be more practical to position the device above the plane of the tank being filled.

Forming a part of the casing 5, are the vertical bars 7 secured to the inner side walls of the casing in any suitable manner, and are disposed substantially intermediate the width of the side members of the casing 5, the same being connected by the horizontally disposed bar 8, which bar 8 forms a support for the bearing 9 having a substantially V-shaped surface 10 coöperating with a knife like bearing 11, carried by each of the pivoted arms 12 to be hereinafter more fully described.

Supported within the casing 5, and including the branches 13 and 14, is a discharge pipe 15 extending through the cover 6 of the casing, and provided with a cap 16, which in turn is supplied with a suitable locking means 17 whereby the upper end of the discharge pipe 15 may be covered and locked to prevent unauthorized persons from tampering with the mechanism to render the same inoperative.

Each of these branch pipes 13 and 14 is provided with a threaded extremity 18, which accommodates the threaded portion 19 of the supporting collar 20 provided with a flange 21 for the purpose of contacting with the annular flange 22 formed on the nozzle 23, which flange 21 supports the nozzle 23 in proper relation with the discharge end of the respective pipes 13 and 14.

Forming a part of the nozzle 23, is a bearing 24 supported substantially centrally of the nozzle 23 at one end thereof, there being a similar bearing 25 supported adjacent the lower end of the nozzle 23, which bearings are in vertical alinement with each other to accommodate the valve stem 26 carrying a valve 27 on the upper extremity thereof, which valve member 27 is provided with a suitable washer 28, which washer 28 is adapted to control the opening 29 to open and close the same thus permitting fluid to pass from the pipe 13 or 14 through the discharge nozzle.

The lower extremities of the valve stems lie in a plane below the lower end of the nozzles to which the same are applied, so that the same may be tripped or moved vertically by means contacting therewith for operating the valve member 27 as before described.

The pivoted arms 12, are supported intermediate their lengths by means of the bearing members 10 and 11, and each of these arms is provided with a slotted portion adjacent one of the ends thereof, the slotted portion being indicated at 30 and extends from a point adjacent one end thereof to a point adjacent the bearings which support the same so that an unlimited adjustment may be had, of the weight 31, which weight is provided with a depending threaded shank operating in the slotted portion 30, and a lock nut 32 operating on the threaded shank for locking the weight 31 in various positions of adjustment, the lock nut 32 being of any suitable construction to prevent movement of the weight after the same has been moved to a predetermined position.

On the end of each of the pivoted arms 12, opposite to the end on which the weight 31 is supported, is a funnel 33, which has its flared portion extending above the upper plane of the arm associated therewith, the lower extremity of the funnel passing through an opening 34 in the arm, the extreme lower end thereof extending into the container 35, there being a transversely extending pin 36 for securing the funnel 33 to the arm 12.

The pin 36 extends through openings formed in the side walls of the relatively straight portion of the funnel 33, and the ends thereof extend beyond the side walls of the funnel 33 and pass through openings 37 formed in the arm 12, whereupon the extreme ends of the pin 36 pass through openings 38 formed in the connecting links 39, cotter pins 40 being provided to prevent lateral movement of the pin 36, within the bearings or openings through which the same passes.

This pin 36 has connection with the connecting link 39 adjacent the upper ends thereof, the lower ends of the connecting link having pivotal connection with the upwardly extending ears 41 formed on the bottom of the respective tanks 35 and 35', the ears 41 being disposed adjacent the side walls of the respective tanks so that the links will properly balance the weight of the contents of the tanks or containers 35 and 35'.

Formed within the bottom of each of the containers is an opening 42, the same being disposed centrally thereof, the walls forming the bottom being inclined as at 43 to discharge fluid to the opening 42, so that the entire contents of the containers may flow therefrom.

An apertured cross bar 44 extends across the opening 42 of each of the containers 35 and 35', the aperture in the cross bar forming a bearing for the valve stem 45, which carries the valve member 46 on the upper end thereof, the lower end of the valve stem 45 extending below the cage 47 and is provided with a head 48, which head 48 is adapted to contact with the cross pin 49 positioned within the upper end of one of the delivering pipes 50, below the mouth thereof, so that when one of the tanks moves downwardly the valve stem 45 contacts with the pin 49 to cause the valve 46 to uncover the opening 42, to the end that the contents of the container is discharged in the delivering pipe.

A cage including the vertical rods 51 is supported within the housing in a position to substantially house the respective tanks to insure a true vertical movement thereof when the same are moving downwardly to discharge their contents.

Dash pots 52 are supported within the housing 5, and have connection with the pivoted arms 12 through the medium of the rods 53 operating therein, and it is of course obvious that when these arms move in either direction, the movement thereof is restricted by the operation of the rods 53 within the dash pots 52, so that the arms 12 do not move to the limit of their vertical movements too quickly, which would result in jars being directed to the mechanism thereof resulting in throwing the mechanism out of alinement.

In order that the containers 35 may be held to the limit of their downward movement, so that the same will not move upwardly, until the entire contents thereof has been discharged, I have provided the toggles 54, which include the pivoted arms 55 and 56 pivoted as at 57, the arms 56 of each toggle having an ear 58 apertured as at 59 and extending toward the center of the housing 5.

Each of the pivoted arms 12 has connection with a toggle 54, by means of the lower arm 56 thereof, which arm 56 is pivoted as at 60, adjacent the end of the arm 12, which supports the tank 35 carried thereby. It will thus be seen that when the tank 35 of the respective arms moves to its discharging position, the arms 55 and 56 straighten, or move to a position to secure the tank 35 in its discharging position, a predetermined period, to insure the entire contents being discharged.

As shown these toggles are supported adjacent opposite sides of the housing 5, but have connection with each other through the flexible connection 61, which has its end positioned in the openings 59 of the ears 58 so that when the arms of one toggle move to a position where the same are in a direct line with relation to each other, the arms of the opposed toggle are moved to a position as indicated in dotted lines in Fig. 1 of the drawings, in other words the toggle is broken, to permit the weight 31 on the opposite end of the arm to cause the arm to move to a horizontal position to be filled.

The registering apparatus is of any suitable visible type, supported in full view of the operator, and one which may be operated by a pivoted arm such as indicated at 62, which arm is shown as contacting with the ends 63 and 64 of the arms 65, which arms are pivoted within the casing by means of the pivot pins 66, the outer ends of each of the arms 65 terminating at points in close proximity to the side walls of the housing 5 where the same have pivotal connection with the arms 67.

These arms 67 operate through the bearings 68 supported within the casing, and are free to move vertically therein, the lower end of each of the arms 67 being provided with a shoulder 69 and a camming edge 70 which camming edge 70 coöperates with the inclined edge 71 with the respective arms 12, so that when the arms 12 move downwardly they will contact with the shoulders 69 to cause a downward movement of the arms 67, with the result that the arms 65 rock on their pivot pins 66 to cause the extreme ends thereof to move the actuating arms 62 causing the operation of the registering mechanism not shown. It is therefore obvious that upon each movement of each container 35, the registering mechanism is moved to indicate that a predetermined quantity of fluid has been discharged.

In the operation of the device, the discharge pipe 15 is connected with any suitable discharge pipe of a portable tank used to fill the tank associated with the measuring device, the tank however being of any suitable construction and not shown in the drawings.

The containers 35 are now in a position as indicated by Fig. 1 of the drawings, that is, one of the containers 35 being in a position to receive fluid through the pipe 14 while the opposite container 35 is in a discharging position. It follows that when fluid is directed through the pipe 15, that the container 35 shown as in its upper position receives the fluid, the valve 27 being automatically held in an open position. It is of course understood that the weight 31 is moved to a position to balance a predetermined quantity of fluid within the tank 35, so that when the tank 35 has received a quantity of fluid to overbalance the weight 31 positioned on the opposite end thereof, the container 35 leaves the discharge pipe 14, the valve 27 forming a part of the nozzle 32 thereof automatically falling to a closing position.

The toggle associated with the tank 35 which has been filled straightens to exert a direct pressure on the arm to hold the same downwardly to the end that the tank is held in such downward position until the contents thereof has been discharged, the valve stem 45 contacting with the pin 49 causes the valve 46 to open to permit such discharge of fluid.

When the toggle 54 moves to support the tank in its discharging position, it is obvious that movement of the flexible connection 61 caused by such movement of the toggle 54, breaks the opposed toggle to permit the opposite arm to move to a position to receive fluid from the pipe 13.

It is of course understood that the operation described continues until the register, not shown, indicates that the desired quantity of fluid has been discharged into the tank, not shown, and which has connection with the delivering pipe 72 to receive the fluid therefrom.

Having thus described the invention, what is claimed is:—

1. In a liquid dispensing apparatus, a casing, discharge pipes and feed pipes within the casing, a pair of pivoted arms within the casing and operating between the pipes, a container supported on one end of each arm, a funnel carried by each of the arms for directing fluid to the containers, means for guiding the containers in their movements, means actuated by the containers for discharging fluid into the containers, means for automatically discharging fluid from the containers, and means carried by the respective arms for overbalancing the empty containers to cause the same to move upwardly.

2. In a liquid dispensing apparatus, a casing, discharge pipes and feed pipes within the casing, a pair of pivoted arms within the casing and operating between the pipes, a container carried by one end of each of the arms, means for moving the containers into engagement with the delivering pipes, a toggle having connection with each of the arms, means for connecting the toggles whereby movement of one toggle will result in a relative movement of the opposed toggle, and means for cushioning the movement of the containers.

3. In a liquid dispensing apparatus, a casing, discharge pipes and feed pipes within the casing, a pair of pivoted arms within the casing and operating between the pipes, a container supported by one end of each of the arms, an adjustable weight carried by one end of each of the arms, said weights adapted to restrict movement of the arms, means carried by each of the containers for controlling the discharge of fluid from the discharge pipe, means for discharging fluid from the containers, and means having connection with each of the arms for holding the containers into engagement with the delivering pipes and means for releasing the containers.

4. In a liquid dispensing apparatus, a casing, discharge pipes and feed pipes within the casing, a pair of pivoted arms within the casing and operating between the pipes, a container carried by one end of each of the arms, each of said arms having an opening therethrough, a funnel disposed in each of the openings, a nozzle forming a part of each of the discharge pipes, means on one end of each of the arms for moving the funnels into engagement with the nozzles, means forming a part of the nozzles for permitting the discharge of fluid from the discharge pipe, means within each of the funnels for operating said first mentioned means, means for permitting the discharge of fluid from the containers, and toggles for securing each of the containers to the limit of their downward movement, and means for releasing the containers.

5. In a liquid dispensing apparatus, a casing, discharge pipes and feed pipes within the casing, a pair of pivoted arms within the casing and operating between the pipes, a container carried by one end of each of the pivoted arms, means for permitting the discharge of fluid into the containers, means for permitting the discharge of fluid from the containers, a pair of pivoted arms having connection with each of the arms, for holding the containers into engagement with the delivering pipe, a chain having connection with the arms, said chain adapted to exert a pressure on the arms to cause the arms to release the containers, and means for cushioning the movements of the arms.

In testimony that I claim the foregoing as my own, I have hereto affixed my signature in the presence of two witnesses.

JULIUS CLINTON MOORE.

Witnesses:
W. M. DUNCAN,
L. F. YOST.